United States Patent [19]

Cuisia et al.

[11] 4,067,690

[45] Jan. 10, 1978

[54] BOILER WATER TREATMENT

[75] Inventors: Dionisio G. Cuisia, Chicago; Chih M. Hwa, Arlington Heights; Jose T. Jacob, Lake Zurich; Murrell L. Salutsky, Highland Park, all of Ill.

[73] Assignee: Chemed Corporation, Cincinnati, Ohio

[21] Appl. No.: 767,151

[22] Filed: Feb. 9, 1977

Related U.S. Application Data

[63] Continuation-in-part of Ser. No. 683,106, May 4, 1976, abandoned, which is a continuation of Ser. No. 559,184, March 17, 1975, abandoned.

[51] Int. Cl.$^2$ ............................................. C23F 11/08
[52] U.S. Cl. ................................ 21/2.7 R; 252/387; 252/392
[58] Field of Search ................... 210/57, 58; 21/27 R; 252/178, 180, 181, 387, 392, 394

[56] References Cited

PUBLICATIONS

"Corrosion Technology," Dec., 1975, Chart between pp. 28 and 29.

*Primary Examiner*—Thomas G. Wyse
*Attorney, Agent, or Firm*—Charles L. Harness

[57] ABSTRACT

The invention disclosed provides a method for boiler water treatment to retard corrosion due to dissolved oxygen. Hydroxylamine, certain derivatives thereof and their salts have now been found to be highly effective oxygen scavengers for use in boiler water and thereby effect reduction of corrosion resulting from dissolved oxygen.

6 Claims, No Drawings

BOILER WATER TREATMENT

This is a continuation-in-part of Ser. No. 683,106, filed May 4, 1976, now abandoned, which is a continuation of Ser. No. 559,184, filed Mar. 17, 1975, now abandoned.

This invention relates to a method for retarding corrosion in boiler water systems due to dissolved oxygen by adding to the boiler water as oxygen scavengers, hydroxylamine, certain derivatives thereof and their water-soluble salts. The invention is intended for use in high pressure boiler water systems, i.e., those operating at a temperature in the range of about 298° to 637° F. and at a pressure in the range of about 50 to 2000 psig in the heated areas. The metal surfaces exposed to these conditions are generally iron and steel.

Dissolved oxygen is objectionable in water used for industrial purposes because of the corrosive effect on iron and steel with which the water comes in contact. In cold and hot water lines, failure of piping may occur and the lines may become blocked with the products of corrosion. "Red water" and iron stains may result by means of iron brought into solution by the corrosive attack of dissolved oxygen. Increased temperatures and low pH values have been known to accelerate oxygen attack.

In boiler systems, corrosion may occur in feed lines, heaters, economizers, boilers, steam and return lines formed of iron and steel. Dissolved oxygen in boiler water is a principal factor influencing corrosion of such metals.

Use of chemicals as oxygen scavengers has been usually accomplished by means of sodium sulfite or hydrazine.

Another means for preventing attack of dissolved oxygen involves addition of alkaline treatment chemicals. The theory behind this treatment relies on the formation of a thin film of calcium carbonate for preventing contact of dissolved oxygen with the surface to be protected. If not carefully controlled, heavy scale may develop and correspondingly this method of treatment, similar to the use of sodium silicate, is limited.

Research toward increasing the speed of the oxygen-sulfite reaction has found that certain materials act as catalysts in speeding this reaction. The most suitable catalysts are heavy metal cations having two or more valences. Iron, copper, cobalt, nickel and manganese are among the more effective catalytic aids to the oxygen-sulfite reaction. Combinations of several of these heavy metal cations have proved effective in providing a continuously active influence on the speed of reaction.

As boiler operating pressures have increased, two disadvantages in the use of sodium sulfite as a chemical deaerant have become evident. The product of the sodium sulfite-oxygen reaction is sodium sulfate ($Na_2SO_4$) which increases the dissolved solids concentration of the boiler water. While the increase in dissolved solids in low or medium pressure boilers is generally of little consequence, it can be significant in high pressure boilers. Also, at high pressure, the sulfite in the boiler tends to decompose to form acidic gases, sulfur dioxide ($SO_2$) and hydrogen sulfide ($H_2S$) which can contribute to corrosion in the return system.

Hydrazine, which does not possess these disadvantages for high pressure operation, can react with dissolved oxygen. The advantage of hydrazine is that the decomposition products are ammonia and nitrogen. The ammonia is alkaline and therefore will not attack steel. At the same time, the ammonia will neutralize carbon dioxide so that return line corrosion due to carbon dioxide will be reduced. Hydrazine, however, is a toxic liquid and therefore must be handled with unusual care.

Thus, although the art has known a number of useful oxygen scavengers for control of corrosion in boiler water systems, they have suffered from severe difficulties.

It has now been found that by practice of the present invention, there is provided a new improved method for control of corrosion in boiler water systems and other aqueous systems which overcomes many of the disadvantages of prior art systems.

Generally stated, the present invention provides a method for control of corrosion in boiler water systems by means of hydroxylamine, certain of its water-soluble salts, and derivatives of hydroxylamine which serve as oxygen scavengers. Oxygen scavengers found useful herein have the following general formula:

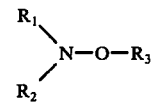

wherein $R_1$, $R_2$, and $R_3$ are either the same or different and selected from the group consisting of hydrogen, lower alkyl having between 1 to about 8 carbon atoms, and aryl such as phenyl, benzyl and tolyl. Specific examples of oxygen scavengers usefully employed herein include hydroxylamine, oxygen-substituted and nitrogen-substituted derivatives and the water-soluble salts thereof such as the chloride, sulfate, acid sulfate, phosphate and sulfite. Approximately 1 part per million of hydroxylamine or an equivalent amount of a derivative is needed to remove each part per million of oxygen. Dosages used are, therefore, relative to the oxygen content of the water to be treated. These materials may be added to boiler water in an effective amount such as between 0.001 to about 500 parts (as hydroxylamine) per million parts of water. Preferably, amounts between 0.01 to about 50 parts per million are adequate and are thus preferred.

Hydroxylamine and its salts have been used in certain anti-corrosion applications in the past. British Pat. No. 659,736 shows the use of hydroxylamine nitrite with a polyhydric alcohol and nitrite for corrosion control in an aqueous system, such as auto coolant systems, hydraulic brake fluids, and steam heating systems (such aqueous systems may contain dissolved air and/or oxygen.) However, use in boiler water systems at elevated temperatures and pressures is not taught, nor does the patent teach the use of hydroxylamine apart from a polyhydric alcohol and nitrite. The instant invention excludes the use of these materials.

*Corrosion Technology*, December 1965, Chart between pages 28 and 29, teaches that hydroxylamine controls corrosion of hydrochloric and sulfuric acids in mild steel, methyl chloride in aluminum, and nitric acid in copper.

In the specification and claims, by boiler feed water, boiler water, and boiler water system is meant the water in the boiler system plus attendant minor amounts of salts and dissolved air and/or oxygen that result from the use of commercially available waters in industrial boiler systems. Such boiler systems may also include small amounts of additives normally used for control of corrosion, scaling, sedimentation, pH, hardness and the like. These systems exclude any polyhydric alcohols such as ethylene glycol, used to prevent freezing in fluids such as auto radiator water. The invention contemplates the addition of the hydroxylamine material to the boiler water system at any point, including to the relatively cool condensate.

Practice of the present invention will become more apparent from the following non-limited examples.

EXAMPLE 1

The effectiveness of hydroxylamine and its salts as an oxygen scavenger was investigated under experimental boiler conditions, i.e. 375 psig and 442° F.

During the test, the boiler feedwater was saturated with dissolved oxygen by continuous aeration. The dissolved oxygen in the feedwater ranged from 9 to 10 mg/l (as $O_2$). The boiler steam was condensed through a heat exchanger producing a condensate temperature of 55° F. The condensate was then passed through a chamber in which an oxygen probe was inserted to monitor the dissolved oxygen. A blank run without an oxygen scavenger was first conducted until a constant level of dissolved oxygen was attained. Once the initial dissolved oxygen reading was established, the oxygen scavenger being tested was fed into the boiler. The reduction of the dissolved oxygen in the condensate was then recorded.

Other boiler water treatment chemicals such as sodium hydroxide and disodium phosphate for alkalinity and calcium hardness controls were also added during experimental runs. The feedwater contained 10 ppm (as $CaCO_3$) total hardness.

At a dosage of 60 ppm active in the feedwater of oxygen scavengers, the following results were obtained.

TABLE 1

| Oxygen Scavenger | Dissolved Oxygen (mg/l) in the Condensate | | % Reduction of Dissolved Oxygen |
|---|---|---|---|
| | Initial | Final | |
| Sodium sulfite ($Na_2SO_3$) | 3.00 | 0.095 | 96.8 |
| Hydrazine ($N_2H_4$) | 3.75 | 0.10 | 97.3 |
| Hydroxylamine hydrochloride ($NH_2OH \cdot HCl$) | 3.40 | 0.06 | 98.2 |
| N,N-Diethylhydroxylamine ($(C_2H_5)_2NOH$) | 3.70 | 0.06 | 98.4 |

EXAMPLE 2

Using the method of Example 1, hydrazine and hydroxylamine were compared in the following tables at various dosages in the feedwater.

TABLE 2

HYDRAZINE
Initial Condensate Dissolved Oxygen: 3.30 mg/l (as $O_2$)

| Dosage In the Feed, mg/l as $N_2H_4$ | Final Dissolved Oxygen in the Condensate, mg/l as $O_2$ | % Reduction of Dissolved Oxygen |
|---|---|---|
| 2.1 | 2.60 | 21.2 |
| 4.2 | 2.00 | 39.4 |
| 6.3 | 1.70 | 48.5 |
| 8.4 | 1.50 | 54.4 |
| 10.5 | 1.15 | 65.2 |
| 12.6 | 0.88 | 73.3 |
| 16.8 | 0.24 | 92.7 |
| 18.9 | 0.08 | 97.8 |

EXAMPLE 3

The procedure of Example 1 was repeated except using hydroxylamine. The following results were recorded:

TABLE 3

HYDROXYLAMINE
Initial Condensate Dissolved Oxygen: 3.75 mg/l (as $O_2$)

| Dosage in the Feed, mg/l as $NH_2OH$ | Final Dissolved Oxygen in the Condensate, mg/l as $O_2$ | % Reduction of Dissolved Oxygen |
|---|---|---|
| 2.85 | 3.05 | 18.7 |
| 5.7 | 1.90 | 49.3 |
| 8.57 | 1.10 | 70.7 |
| 11.4 | 0.49 | 86.9 |
| 14.2 | 0.21 | 94.4 |
| 17.1 | 0.09 | 97.6 |

EXAMPLE 4

The procedure of Example 1 was repeated except using N,N-diethylhydroxylamine. The following results were recorded:

TABLE 4

N,N-DIETHYLHYDROXYLAMINE
Initial Condensate Dissolved Oxygen: 3.70 mg/l (as $O_2$)

| Dosage in the Feed, mg/l as $(C_2H_5)_2NOH$ | Final Dissolved Oxygen in the Condensate, mg/l as $O_2$ | % Reduction of Dissolved Oxygen |
|---|---|---|
| 12 | 1.20 | 67.6 |
| 18 | 0.41 | 88.9 |
| 24 | 0.27 | 92.7 |
| 30 | 0.06 | 98.4 |

EXAMPLE 5

The oxygen scavenging activity of hydroxylammonium acid sulfate (HAS) was measured at 68° F. A dosage of 10% excess HAS (as $NH_2OH$) was used based on 1 ppm $NH_2OH$ is required per 1 ppm dissolved oxygen. The pH of the testing solution was adjusted by using dilute sodium hydroxide solution. The following results were recorded:

TABLE 5

HYDROXYLAMMONIUM ACID SULFATE
AND OXYGEN REACTION RATE AT 68° F

| Time in Minutes | Dissolved Oxygen, mg/liter | |
|---|---|---|
| | pH = 9 to 11 | pH above 11 |
| 0 | 8.50 | 8.50 |
| 2 | 7.30 | 3.25 |
| 4 | 6.90 | 0.005 |
| 5 | 6.30 | 0.005 |
| 15 | 5.30 | 0.001 |
| 20 | 4.50 | 0.000 |
| 30 | 2.80 | 0.000 |
| 60 | 0.90 | 0.000 |

EXAMPLE 6

The oxygen scavenging activity of N,N-diethylhydroxylamine (DEHA) was determined at 68° F. without a catalyst and with a catalyst copper carbonate in a ratio of DEHA to catalyst of 100:1 parts by weight. A dosage of 10% excess DEHA was used based on 1 ppm of DEHA is required per 1 ppm of dissolved oxygen. The pH of the testing solution was adjusted by using dilute sodium hydroxide solution. The following results were recorded:

TABLE 6

N,N-DIETHYLHYDROXYLAMINE AND OXYGEN REACTION RATE AT 68° F. AND pH 11

| Time in Minutes | DISSOLVED OXYGEN, mg/liter | |
|---|---|---|
| | No Catalyst | Copper Carbonate as Catalyst |
| 0 | 8.60 | 8.70 |
| 5 | 7.30 | 3.70 |
| 10 | 6.65 | 2.50 |
| 15 | 5.90 | 1.95 |
| 20 | 5.75 | 1.40 |
| 30 | 5.10 | 0.40 |
| 60 | 4.60 | 0.10 |

EXAMPLE 7

The oxygen scavenging activity of hydrazine was determined at 68° F. A dosage of 10% excess hydrazine was used based on 1 ppm of hydrazine is required per 1 ppm of dissolved oxygen. The pH of the testing solution was adjusted by using dilute sodium hydroxide solution. The following results were recorded:

TABLE 7

HYDRAZINE AND OXYGEN REACTION RATE AT 68° F. and pH 11

| Time in Minutes | Dissolved Oxygen, mg/liter |
|---|---|
| 0 | 8.40 |
| 5 | 8.30 |
| 10 | 8.30 |
| 15 | 8.20 |
| 20 | 8.10 |
| 30 | 8.00 |
| 60 | 7.60 |

As shown in Examples 1, 3, 4, 5, and 6, excellent oxygen scavenging activity was demonstrated by hydroxylamine, hydroxylamine hydrochloride, hydroxylammonium acid sulfate, and N,N-diethylhydroxylamine. By comparing Examples 5 and 6 with Example 7, the advantage of hydroxylammonium acid sulfate and N,N-diethylhydroxylamine over hydrazine is evident. The following compounds according to this invention show similar unexpected oxygen scavenging activities when tested by the procedure described in Example 1.

Example No.
8 Hydroxylamine phosphate
9 N-Ethylhydroxylamine
10 N,N-Dimethylhydroxylamine
11 O-Methylhydroxylamine
12 O-Hexylhydroxylamine
13 N-Heptylhydroxylamine
14 N,N-Dipropylhydroxylamine
15 O-Methyl N,N-diethylhydroxylamine
16 N-Octylhydroxylamine
17 O-Ethyl N,N-dimethylhydroxylamine
18 N,N-Diethylhydroxylamine hydrochloride
19 N-Methyl N-ethylhydroxylamine
20 O-Methylhydroxylamine phosphate
21 N-Butylhydroxylamine
22 N-Benzylhydroxylamine ($\beta$-Benzylhydroxylamine)
23 O-Benzylhydroxylamine ($\alpha$-Benzylhydroxylamine)
24 N,N-Diethylhydroxylamine acetate The presently used hydroxylamines may be catalyzed using any of a number of well known catalyst used in sodium sulfite or hydrazine boiler water treatment methods. Alkali metal hydroxides, water soluble metal salts, hydroquinone, and benzoquinone are also found to be useful catalysts.

It will be understood that modifications and variations may be effected without departing from the spirit and scope of the novel concepts of this invention.

What is claimed is:

1. A method for control of corrosion of iron and steel surfaces in boiler apparatus caused by dissolved oxygen, in an aqueous boiler water system which consists essentially of boiler water containing dissolved oxygen, said boiler system being operated at a temperature of 298° to 637° F. and 50 to 2000 psi which comprises adding to the said system an effective amount, 0.001–500 parts per million parts of water, of an oxygen scavenger having the general formula:

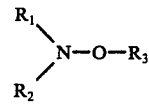

where $R_1$, $R_2$, and $R_3$ are either the same or different and selected from the group consisting of hydrogen, lower alkyl and aryl, and the water-soluble salts thereof.

2. The method of claim 1 wherein the oxygen scavenger is present in an amount between 0.01 to about 50 parts per million of water.

3. The method of claim 1 wherein the lower alkyl group has between 1 and about 8 carbon atoms, and the aryl is selected from the group consisting of phenyl, benzyl and tolyl.

4. The method of claim 1 wherein the oxygen scavenger water-soluble salt is selected from the group consisting of chloride, sulfate, acid sulfate, phosphate and sulfite.

5. The method of claim 1 wherein the oxygen scavenger is hydroxylamine.

6. The method of claim 1 wherein the oxygen scavenger is N,N-diethylhydroxylamine.

* * * * *